United States Patent Office 3,145,708
Patented Aug. 25, 1964

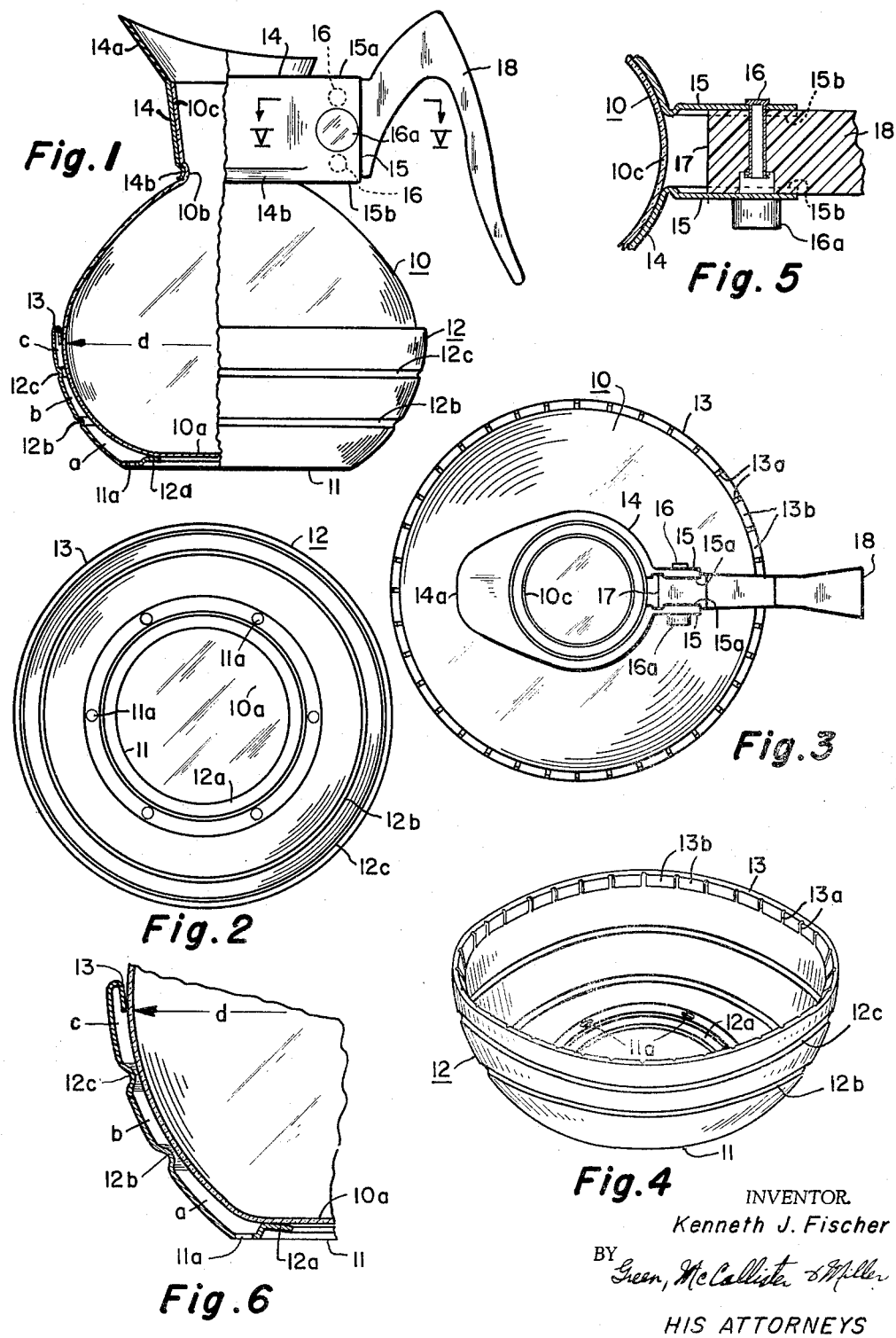

3,145,708
BREWING VESSEL AND PROTECTOR THEREFOR
Kenneth J. Fischer, Pittsburgh, Pa., assignor to Carson Mfg. Co., Pittsburgh, Pa., a corporation of Pennsylvania
Filed Sept. 24, 1962, Ser. No. 225,587
8 Claims. (Cl. 126—390)

This invention relates to a protective cup or lower member for improving the operating life and the thermo operating efficiency of a vessel for containing fluids to be heated, such as in the making of coffee. It also pertains to a collar-spout handle for facilitating the replacement of a vessel that is subject to breakage, such as glass or ceramic, and for providing a combined collar and pouring spout.

This is a continuation-in-part of my application filed February 18, 1960, Serial No. 9,521, entitled "Brewing Vessel" and now abandoned.

Although a vessel or somewhat bowl-shaped container body used for brewing, cooking or heating liquids, such as coffee, is usually made of a material that is more resistant to heat damage, such as Pyrex glass, I have found that, particularly in commercial establishments, such as restaurants, the relatively thin wall vessel body has to be replaced very frequently due to breakage resulting from the heating operations and expansion and contraction of the body under conditions of frequent heating and cooling. For example, it is common for a small restaurant serving about 300 customers per day and having eight bowls in use to have to replace about two to six bowls for each one in use during a period of about one year, or a total maximum of about thirty-six vessel body or bowl replacements per year, where such bowls are of a heat-resistant type of glass. However, a translucent or transparent body, such as of glass, is highly desirable, since it gives a visual indication to the cook or operator as to the mixing of and condition of the brew or liquid.

In an endeavor to solve the problem of the high costs involved in the frequent replacement of brewing vessel bodies, I set out to determine the factors involved in order to find a practical solution. I discovered that a glass or ceramic coffee maker tends to crack and break along its bottom area that includes the portion thereof that is directly subjected to the heating source or flame, and along the connecting, adjacent or intermediate portion which lies between such direct heating portion and the upper portion of the vessel body which is relatively remote to the heating agency. I determined that even where the vessel body is of a better and more temperature-resistant type of material, such as Pyrex glass, that frequent breakage still occurs. Heat applied by a direct support engagement or contact abutment of the bottom of the vessel body with a metal grid or element of the heating unit tends to cause an adverse chemical decomposition of the body at and adjacent to such point of direct contact and its expansion and contraction moves it through such extreme limits that breakage soon occurs. In this connection, the adverse effect is increased where the flame is allowed to become too intense, which frequently occurs when the operator or attendant is working at other tasks.

After a full evaluation of these and other factors involved, I discovered that a body in the nature of vitreous or ceramic material can be given an operating life of eight or nine times its normal life by the employment of a metal bottom cup, cap or enclosure in a proper manner. The discovery of how this can be successfully accomplished is an important phase of my invention.

It thus has been an object of my invention to determine the factors involved in providing and improving the operating life of a brew vessel or container body of a material that is normally subject to easy breakage due to the application of heat to its bottom area for brewing liquids therein;

Another object has been to devise a solution to the problem of the extremes of expansion and contraction as well as chemical deterioration of the vessel body that is used for brewing liquids;

A further object has been to devise a bottom cup or cap member or part employed in such a manner as to eliminate difficulties heretofore encountered in the use of a vessel body, such as of vitreous or ceramic material, and to provide a practical solution to the problem heretofore encountered in connection therewith;

These and other objects of my invention will appear to those skilled in the art from the drawings and the description of an illustrated embodiment thereof.

FIGURE 1 is a side view in elevation of a brewing vessel employing features of my invention;

FIGURE 2 is a bottom plan view on the scale of and of the vessel of FIGURE 1 with its top assembly removed;

FIGURE 3 is a top plan view on the scale of and of the vessel of FIGURE 1;

FIGURE 4 is a perspective view of a bottom member, protector cup or cap that is shown applied to the vessel body in FIGURE 1;

FIGURE 5 is an enlarged horizontal fragment illustrating details of the construction and mounting of a top collar and handle assembly shown in FIGURE 1;

And, FIGURE 6 is an enlarged fragmental sectional detail showing the fitted-on relation in actual scale of my protector cup or cap with respect to the vessel body of FIGURE 1.

In carrying out my invention, I provide a backing or cover facing member, part or device in the form of a metal protector cover, cup or cap 12 having a one-piece, peripherally-continuous face wall of somewhat spherical section which is adapted to be positioned to extend from an outer area of a bottom portion of a bowl-like body 10 of a vessel of vitreous or ceramic material, in such a manner as to define a bottom support area for spacing the bottom of the body 10 from direct contact with the metal stove support, such as its heating element or burner grid, and at the same time, to define an exposed central bottom or base area 10a of the body 10 to which the brewing heat or flame may be directly applied. The latter area 10a is framed by and is positioned in an upwardly-spaced relation from the brewing position of a conventional vessel. The adjacent area or portion of the body 10 of the vessel is, in effect, surrounded by the metal facing up to and at least slightly beyond the portion of the bowl of the body 10 which has or defines its greatest diameter or circumference $d$.

The metal backing cover member 12 has a relatively thinner thickness than the wall of the body 10 and is mounted in such a manner as to define dead air spacing between its wall and the opposed side wall surface area of the vessel body 10 and to close-off such spacing from the standpoint of a direct application of the heat that is applied to the bottom area 10a of the vessel body. In addition, the protector cover or cap member 12 is provided with a group (at least a pair—upper and lower) of laterally or vertically spaced-apart, relatively narrow, banding or annular, somewhat narrow contacts along its vertical extent with respect to the outer wall face of the vessel body 10. The metal cover or cap 12 extends from a central, disc-like bottom area 10a upwardly along the bottom side wall of and at least slightly beyond the widest circumference $d$ of the body 10 to, in effect, enclose a bottom portion of the body which would normally have a contacting abutment with a heating support as well as adjacent side portions of the body which are normally intermediate between the hotter and the cooler portions thereof, and for this reason, which are subjected to greater stress and strain. Metal protector member or part 12 of my invention is constructed in such a manner that it may be readily applied to and removed from the vessel body 10, see the serrations in an upper, inwardly-projecting rim, leg or support portion 13. It will be noted that leg portion 13 defines inwardly-downwardly turned tabs 13b that flexibly-engage the outer diameter of the body 10, and provide a substantially dead air space b with a bottom portion 12a along the enclosed wall area of the body 10. The tabs 13b are shown as of substantially rectangular shape, and as having narrow vertical separating serrations or slits 13a whose widths are relatively narrow as compared to the tabs. The slits extend along the full inside width or vertical extent of the bent-over band from which the tabs are formed. The construction is such that the protector cup 12 has a tight, snap-on fit on the body 10 and may be removed by pushing downwardly on the rounded upper edge of the portion 13 to flex the protector and snap it off. This facilitates replacement of such body and periodic separate cleaning of it.

Referring particularly to FIGURES 1 and 3, my metal protector cap or cup member 12 may be of a suitable metal, such as stainless steel, aluminum alloy, or brass, that preferably has a polished outer surface for reflecting heat, for improving its appearance, and for facilitating its washing and cleaning. A spun stainless steel cap 12 has been found to be highly satisfactory. It must have an inherent flexibility or resiliency, such that it may be mounted in a clamping, expansion and contraction-controlling relationship about the bottom of the vessel body 10; it may have a coefficient of expansion and contraction approximating that of the vessel body 10. As the member 12 is used, it controls the expansion and contraction of the area of the vessel body about which it is positioned in a flexible manner so as to give such vessel body a strength of at least twice its normal strength and, in this sense, to serve as a backing or reinforcing structure and of a type that has a limited area of contact, as defined by inwardly, backwardly or radially-projecting, annular framing, circular rim, flange or leg portions 12a, 12b, 12c and 13 whose limited areas have a vertical spacing with respect to each other along the cap member. Such contact legs extend inwardly substantially perpendicular to the curved front face portion of the member 12 and, with the face portion, define an expansion-control arch structure. My protector 12 gives the body 10 an increased life in use of about eight to nine times its normal period.

The annular leg or inwardly-offset portions 12b and 12c which are intermediate the portions 12a and 13 strengthen the construction; also, the upper leg or offset portion 12c defines a pivot area to add desirable flexibility to the upper wall band that lies between the portion 12c and gripping leg portion 13. As shown in FIGURES 1 and 6, the leg portions 12b and 12c are defined by inwardly-convex or rounded, offset ring or annular portions of the protector 12. Although, as hereinafter mentioned, the leg portions 12b and 12c need not provide and preferably do not have a contacting relationship with the wall body 10 of the brewing vessel when it and the protector device 12 are at a normal room temperature, such leg portions, when the vessel body is placed on a heater and its ceramic or vitreous material starts to expand (where it tends to do so at a greater rate than the protector cup), serve to make contact abutment or engagement with the wall of the body 10 and limit further expansion thereof and thus protect it against excessive heat expansion.

As seen in FIGURE 1, as a result of the above-mentioned construction, dead air spaces a, b and c are provided and are defined by framing edge contacts provided by the rim or leg portions 12a, 12b and 12c and 13. The portion 12a constitutes a continuous, rounded, upwardly-offset and inwardly-projecting framing leg, supporting foot or band in a sealing and abutting relation about the centrally-exposed disc-like heating area 10a of the vessel body 10. The portion 12a is shown provided with an inner edge portion that slopes or is slightly beveled downwardly from the base area 10a of the body 10, and with an outer, substantially flat or planar band that lies in contact or abutment with the base area 10a. The portion 12b which defines an annular groove about the outer side face of the part 12, has a continuous, rounded-in, annular ridge flange rib or leg which, in effect, provides a second continuous line contact with and about the outer face of the wall body of the vessel. The portion 12c is similar to the portion 12b, but is located at a laterally-spaced or higher position along the part or member 12.

The portion 13 which is located on the upper converging side of the vessel body, beyond its portion d of greatest diameter or circumference, constitutes an inwardly-projecting framing annular leg, rim, flexibly clamping-on band or flange which is curved into direct contact with the outer face of the vessel body. The annular leg portion 13 is shown provided with a circumferential series of vertical slits, serrations, notches or indentations 13a along its inner edge periphery that define the series of flexible clamping tongues, flanges or lugs 13b to facilitate the mounting and dismounting of the part 12, while at the same time, to substantially confine the air space b; a fully continuous engagement is not vital at this more heat-remote, upper position, although it is important at, for example, the leg portion 12a.

As shown in FIGURES 1, 2, 4 and 6, the protector cup 12 has a rounded wall that terminates adjacent its bottom in a downwardly-offset, relatively planar or flat annular portion 11 that is connected by an upwardly or inwardly-offset shoulder to the leg or foot portion 12a. The portion 11, being spaced from the wall of the body 10 and representing the lowest area of the protector 12, serves as a collector trough or area for condensate and other moisture along the outer wall of the body 10. A group of peripherally spaced-apart drain hole portions 11a are formed in the portion 11 to discharge such moisture.

The vessel body 10 is shown in FIGURE 1 as having a connecting, inwardly-offset, upper grooved-in portion 10b between its bowl and neck, and as having a cylindrical neck portion 10c of substantially uniform diameter which terminates in an upper open mouth portion. A strap metal banding part 14, in the form of a split-sleeve, has an integral pouring spout 14a surmounting it and may be of the same metallic material as the part 12. The split backing portion of the part 14 has a pair of opposed, backwardly-extending mounting flanges, lugs or ears 15 which are adapted to clamp over a flat, substantially rectangularly shaped, connecting or mounting portion 17 of a handle 18 of a suitable non-conducting material, such as of resin, wood, etc.

As shown particularly in FIGURE 3, the flanges 15 have upper side edge portions 15a that are turned-over to engage over upper side edges of the mounting portion 17, and have like bottom edge portions 15b that are also turned-over to engage over the lower edge side edges of the mounting portion 17. I thus provide a pair of opposed flat abutment contacts along side faces of the mounting portion 17 with respect to side faces of the flange portions 15, and aligning, top and bottom contacts along top and bottom faces of the mounting portion 17. A pair of headed-screw and threaded-headed bushing assemblies 16 extend through the portions 15 and 17 to demountably secure them in position with respect to each other, see FIGURE 5.

With reference to the metal cap or cover 12, an important feature is the fact that the portions 12a, 12b, 12c and 13 serve as contact legs with the outer face of the side wall of the body 10 to define a group or plurality of laterally-spaced, expansion-control areas therebetween along such side wall. As a result, the area or portion of the wall of the body 10 that is enclosed, covered or circumscribed by the part 12 is limited as to its expansion and contraction over its normal expansion and contraction and, in such a manner as to greatly strengthen such wall area which, as above pointed out, is the area in which the greatest stress and strain is encountered, leading to breakage and damage. The gauge or thickness of the part 12 is relatively light, for example, it may be in the neighborhood of 26 gauge or less, such that with its normal resiliency or flexibility, it has a flexible expansion and controlling action and particularly, from the standpoint of its greater front or face width extent, as compared to the relatively smaller extent of its backwardly or inwardly extending leg portions 12a, 12b, 12c and 13.

I have found that it is highly important to avoid a cover part 12 defining a fully complementary surface-to-surface type of abutment or fit with the outer face of the body 10 for a number of reasons. A very important factor is that the lack of a group or series of localized expansion and contraction areas will cause a binding breakage of the body, whereas, in accordance with my invention, such areas serve to control or limit expansion and contraction of the body 10, without causing it to break, and in such a manner as to give it a greatly improved resistance-to-breakage strength.

It will be noted that the inwardly-projecting leg or rim contact portions 12a, 12b, 12c and 13 have a relatively shorter inward extent or depth than the lateral width of the face wall of the metal wall part 12, to provide or define localized expansion or contraction zones or areas along the opposed wall portion of the vessel or bowl-shaped body 10. For example, a depthwise extent of rim or leg portions 12a, 12b and 12c of about 1/16 of an inch and of inward spacing of the bottom edges of flexible tabs 13b of about 1/8 of an inch provides about 1/16 of an inch tolerance, clearance or spacing between the inner side of the face wall of the part 12 and the outer side of the opposed wall portion of the body 10. Further, as a result of such expansion controlling areas, the wall portion of the body 10 about which the metal wall part 12 is positioned has less than 1/2 the normal expansion and contraction of the wall of the same vessel or bowl body when used alone to brew a liquid.

I have been able to successfully provide and employ an upper neck mounting or banding part 14 which eliminates the need for a separate gasket-carrying plastic pouring spout and simplifies the provision of a handle, collar and pouring spout assembly for use with a vessel or bowl body of the type being considered. It will be noted that the banding part 14 has, adjacent its lower edge, an inwardly-offset annular bead or rim 14b which has a complementary engaging fit with the annular, connecting grooved portion 10b of the vessel body 10.

Atlhough I contemplate and have provided leg portions 12b and 12c which normally rest in engagement with the outer face eof the bowl 10 of the brewing vessel, I prefer, as illustrated particularly in FIGURE 6 of the drawings, to provide a slight spacing, for example about 1/64 of an inch, between them and such face and have found that, with such spacing, they will still provide continuous annular edge contacts when the vessel is heated, to effectively limit and control outward expansion of the body. By providing a normal slight spacing when the parts are at room temperature, I facilitate cleaning the vessel bowl 10 with the protector 12 in place, since wash water may pass downwardly between the serrations 13a of the leg portion 13, past the leg portions 12b and 12c, into the trough defined by the downwardly-offset portion 11 and out of the latter portion through its drain holes 11a.

It is highly important, however, that the bottom leg or support portion 12a have a tight sealing abutment with the bottom portion 10a of the vessel bowl. I have also found that it is highly important that the continuous major area or banding wall portions of the protector 12 always have a spaced-apart relation with the bowl 10 of the vessel, not only normally, but also when the vessel is heated in brewing coffee, etc. This spacing, in combination with a group of vertically or laterally spaced-apart contact leg portions, has been found to make possible a maximum operating life of the brewing vessel, in that the vitreous or ceramic material is permitted to flexibly expand and contract between the contact leg portions and, at the same time, is flexibly restrained as to maximum expansion by such contact leg portions.

In mounting or snapping-on my protector device 12, I may place it facing upwardly on a table, then place the bowl 10 of the vessel centrally therein, and press downwardly on the bowl or its top portion to flex the leg portion 13. At this time, the tabs 13b of the leg portion snap-over the bowl, beyond its area of maximum diameter d and tightly hold the bottom portion 10a in sealing engagement with the leg portion 12a. In removing the protector device 12, I may pick-up the bowl 10 with the right hand, engage the fingers of the left hand against the rounded top edge of the portion 13, and apply closing force between the fingers and the thumb or the base of the thumb of the left hand in such a manner as to pivot the protector device 12 about the bowl 10 opposite the area of the grip and snap it off. Incidentally, if desired, the snapping-on operation may also be pivotally effected by applying the base of the thumb of the left hand to the portions 11 and 12a and applying the fingers of the left hand in a pressure grip to a side of the bowl 10 above the device 12. The pivot-off action makes it very easy to remove the protector device 12, even though it has a tight snapped-on, automatic-position-aligning fit on the bowl.

It will be noted that the metal protector cup 12 has a relatively-thin flexible and substantially smoothly-rounded metal wall part of somewhat bowl-shape for snap on and off positioning about an opposed outer side and bottom area of the vessel body 10. The in-turned side framing flange or continuous framing leg portion 13 which is located about an upper portion of the metal wall part is employed in combination with the bottom framing support flange or framing leg portion 12a to define an inner, bowl-shaped, vessel-body-engagement area therebetween that is located inwardly along and in a spaced relation with respect to the metal wall part. Such engagement area has a slightly less diameter, at least adjacent the side flange 13, than the corresponding outer diameter of the vessel body 10; this characteristic, the fact that flexible tabs 13b are positioned along the flange 13, and the overall shape and construction of the metal wall part, enable the wall part to be snapped on and off or into and out of a secure mounted engagement on or positioning about the vessel body 10. The outwardly-concave and inwardly-convex leg portions 12b and 12c which are shown located in a vertically-spaced or intermediate position along the metal wall part with respect to the flanges 12a and 13, project inwardly to a slightly-outwardly spaced relation with respect to the above-mentioned bowl-shaped vessel-body-engagement area, but are constructed to limit outward expansion of the vessel body. The trough-like, downwardly-offset portion 11 of the wall part serves to collect moisture from the spacing between the wall part and the vessel-body-engagement area; the hole portions 11a therein serve to drain-off such moisture. The portion 11 also contributes to a flexible engagement of the bottom flange 12a with respect to the bottom of the vessel bowl and thus, to the snap-on and off positioning of the protector cup 12 on the vessel body 10.

It will be noted that the protector cup 12 always snaps into its final centrally-aligned position on the vessel body 10 and does not have to be aligned after it is mounted thereon.

What I claim is:

1. In a protector cup for an upright relatively thin-wall brewing vessel body of a material in the nature of ceramic or vitreous material that is subject to breakage in brewing liquids on a heater, a relatively-thin flexible and substantially smoothly rounded metal wall part of somewhat bowl-shape for snap-on and off positioning about an opposed outer side and bottom area of the vessel body, an in-turned side framing flange about an upper portion of said metal wall part and a bottom framing support flange projecting upwardly from a lower portion of said metal wall part and defining an open central bottom area in said metal wall part, said side and bottom flanges defining an inner bowl-shaped vessel-body-engagement area therebetween that is located inwardly along and in a spaced relation with respect to said metal wall part, said side flange having flexible tabs therealong, and a trough-like portion connecting said bottom flange with a side area of said metal wall part and projecting downwardly with respect to said bottom flange.

2. In a protector cup as defined in claim 1 wherein, at least one outwardly-concave and inwardly-convex continuous framing leg portion extends about said metal wall part and projects inwardly thereof to a slightly-outwardly spaced relation with the bowl-shaped vessel-body-engagement area defined by said side and bottom flanges, and said framing leg portion is located in a vertically-spaced relation between said side and bottom flanges and is constructed to limit outward expansion of the vessel body.

3. In a protector cup for an upright relatively thin-wall brewing vessel body of a material in the nature of ceramic or vitreous material that is subject to breakage in brewing liquids on a heater, a relatively-thin flexible and substantially smoothly-rounded metal wall part of somewhat bowl-shape for snap-on and off positioning about an opposed outer side and bottom area of the vessel body, an in-turned side framing flange about an upper portion of said metal wall part and a bottom framing support flange projecting upwardly from a lower portion of said metal wall part and defining an open central bottom area in said metal wall part, said side and bottom flanges defining an inner bowl-shaped vessel-body-engagement area therebetween that is located inwardly along and in a spaced relation with respect to said metal wall part, said upper flange having flexible tabs therealong, a trough-like portion connecting said bottom flange with a side area of said metal wall part and projecting downwardly with respect to said lower flange, and drain hole portions extending through said trough-like portion for draining moisture from the spacing between the inner bowl-shaped vessel-body-engagement area and said metal wall part.

4. In a protector cup for an upright relatively thin-wall brewing vessel body of a material such as ceramic or vitreous material that is normally subject to breakage in brewing liquids on a heater, wherein the body has a bottom wall to be positioned over a source of heat, has a rounded enclosing bowl-shaped side wall and an upper open-neck wall through which liquids may be introduced and poured which comprises, a continuous enclosing flexible-metal wall part of somewhat bowl-shape for snap on and off positioning about an opposed outer area of the bottom wall and an adjacent opposed outer area of the bowl-shaped side wall of the vessel body; said metal wall part having at least a pair of substantially continuous framing leg portions projecting inwardly therefrom to engage with and position said metal wall part in a spaced relation with and define a group of space-framing supports along the opposed outer areas of the vessel body and control expansion and contraction of the body along such areas, said framing leg portions being constructed to, in combination, removably snap-engage on and off about the vessel body; a lower one of said leg portions projecting upwardly of a bottom portion of said metal wall part to define an open central bottom area in said metal wall part and provide a substantially continuous sealing engagement about an exposed center area of the bottom wall of the vessel body for positioning the exposed central area of the bottom wall of the vessel body in an upwardly-spaced relation with respect to the source of heat; said metal wall part when positioned on the vessel bowl having the characteristic of limiting expansion and contraction of the bowl to less than its normal expansion and contraction, as controlled by the space-framing supports.

5. In a composite brewing vessel construction having an upright somewhat bowl-shaped relatively-thin wall body of a material such as ceramic or vitreous material that is normally subject to breakage when used for brewing liquids on a heater, which body has a bottom wall portion to be positioned over a source of heat, has a rounded enclosing side wall bowl portion and an upper open-mouth neck wall portion through which liquids may be introduced and poured; a continuous flexible-metal wall part having a face wall that is of relatively lesser thickness than the body for positioning about the opposed outer face area of the bottom wall portion and an outer bottom wall area of the side wall bowl portion while the body is being subjected to brewing heat from the heater, said metal part having substantially continuous leg portions inwardly-projecting from said face wall to engage with and position said face wall in a spaced relation with the outer face of the body and define a group of space-framing supports along the opposed outer face area of the body and control expansion and contraction of the body along such area, said leg portions being positioned to, in combination, removably clamp said metal part on the body; the construction being characterized by expanding and contracting substantially less than the normal expansion and contraction of the body alone and as controlled by said framing supports.

6. In a composite brewing vessel construction having an upright somewhat bowl-shaped relatively-thin wall body of a material such as ceramic or vitreous material that is normally subject to breakage when used for brewing liquids on a heater, which body has a bottom wall portion to be positioned over a source of heat, has a rounded enclosing side wall bowl portion and an upper open-mouth neck wall portion through which liquids may be introduced and poured; a continuous flexible-metal wall part having a face wall that is of relatively lesser thickness than the body for positioning about the opposed outer face area of the bottom wall portion and an outer bottom wall area of the side wall bowl portion while the body is being subjected to brewing heat from the heater, said metal part having substantially continuous leg portions inwardly-projecting from said face wall to engage with and position said face wall in a spaced relation with the outer face of the body and define a group of space-framing supports along the opposed outer face area of the body and control expansion and contraction of the body along such area, said leg portions being positioned to, in combination, removably clamp said metal part on the body; the construction being characterized by expanding and contracting substantially less than the normal expansion and contraction of the body alone and as controlled by said framing supports, and by a group of localized expansion and contraction zones along such area of the body between said framing supports; the bottom portion of said metal part being adapted to rest upon a heating support to position the exposed central area of the body in an upwardly-spaced relation with respect thereto over the source of heat.

7. A construction as defined in claim 6 wherein, said leg portions extend about the body and include upper and lower leg portions defining upper and lower enclosing edges of said metal part, said upper leg portion has an inner diameter less than a maximum diameter portion of the body, said upper leg portion has flexible portions therealong engaging about the outer face of the body above such maximum diameter portion thereof to facilitate removal of said metal part from the body, and said leg portions also include intermediate leg portions defining continuous grooves about the outer face area of said metal part.

8. A construction as defined in claim 7 wherein said upper and lower leg portions provide a substantially continuous sealing engagement about the body to define a dead air space area between said metal part and the body, and said flexible portions of said upper leg portion constitute a series of tabs therealong.

References Cited in the file of this patent

UNITED STATES PATENTS

| | | |
|---|---|---|
| 236,181 | Satter | Jan. 4, 1881 |
| 853,173 | Jacobi | May 7, 1907 |
| 882,080 | Savage | Mar. 17, 1908 |
| 890,284 | Kintz | June 9, 1908 |
| 1,106,609 | Altenberg | Aug. 11, 1914 |
| 1,890,323 | Glaeser | Dec. 6, 1932 |
| 2,686,072 | Van Guilder | Aug. 10, 1954 |
| 2,706,571 | Ryan | Apr. 19, 1955 |
| 2,790,669 | Crawford | Apr. 30, 1957 |

FOREIGN PATENTS

| | | |
|---|---|---|
| 8,764 | Great Britain | of 1889 |
| 11,279 | Great Britain | of 1902 |
| 24,932 | France | Nov. 17, 1922 |
| 810,738 | France | Jan. 6, 1937 |